United States Patent
Johnson et al.

(10) Patent No.: US 7,463,408 B2
(45) Date of Patent: Dec. 9, 2008

(54) FAST FULL COLOR ELECTROPHORETIC DISPLAY WITH IMPROVED DRIVING

(75) Inventors: Mark Thomas Johnson, Eindhoven (NL); Lucas Josef Maria Schlangen, Eindhoven (NL); Patrick John Baesjou, Eindhoven (NL); Guofu Zhou, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 66 days.

(21) Appl. No.: 10/576,319

(22) PCT Filed: Oct. 13, 2004

(86) PCT No.: PCT/IB2004/052076
§ 371 (c)(1),
(2), (4) Date: Apr. 18, 2006

(87) PCT Pub. No.: WO2005/040908
PCT Pub. Date: May 6, 2005

(65) Prior Publication Data
US 2007/0064302 A1    Mar. 22, 2007

(30) Foreign Application Priority Data
Oct. 23, 2003    (EP)    ................... 03103915

(51) Int. Cl.
*G02B 26/00* (2006.01)
(52) U.S. Cl. ................... 359/296; 359/290; 359/295
(58) Field of Classification Search ................ 359/296, 359/291, 290, 295, 298
See application file for complete search history.

(56) References Cited

U.S. PATENT DOCUMENTS

| | | | |
|---|---|---|---|
| 6,271,823 B1 * | 8/2001 | Gordon et al. | 345/107 |
| 6,751,007 B2 * | 6/2004 | Liang et al. | 359/296 |
| 2002/0180688 A1 | 12/2002 | Drzaic et al. | |
| 2003/0132908 A1 * | 7/2003 | Herb et al. | 345/107 |

FOREIGN PATENT DOCUMENTS

WO    03019279 A1    3/2003

* cited by examiner

*Primary Examiner*—Ricky Mack
*Assistant Examiner*—Brandi N Thomas
(74) *Attorney, Agent, or Firm*—Michael E. Belk

(57) ABSTRACT

The present invention provides a novel design for color electrophoretic displays. In the display, each pixel (200) comprises at least two sub-pixels (210, 220, 230), and each sub pixel is fitted with a color filter (211, 221, 231) and contains an electrophoretic media comprising two particle types (201, 202, 203). The color filters (211, 221, 231) in the sub-pixels of each pixel have essentially non-overlapping absorption bands, and together cover essentially all of the wavelengths over which the display is operative. Furthermore, the absorption bands of the particles in each sub-pixel (210, 220, 230) each cover a portion of the wavelengths that is not covered by the filter (211, 221, 231) in the respective sub-pixel. The wavelength bands typically correspond to different colors. Thereby each wavelength band, or color, can be emitted by more than one sub-pixel in each pixel, resulting in increased brightness. According to one particular embodiment, each pixel comprises three sub-pixels having a cyan, magenta, and yellow absorbing filter, respectively.

21 Claims, 3 Drawing Sheets

FAST FULL COLOR ELECTROPHORETIC DISPLAY WITH IMPROVED DRIVING

The present invention relates to electrophoretic displays, and in particular to color electrophoretic displays providing high brightness, high updating speeds and ease of manufacturing.

Full color electrophoretic displays can be provided using a monochrome display in combination with a structured RGB (Red, Green, Blue) color filter—this has been demonstrated using an E-Ink display. A structured RGB filter transmits red, green, and blue light through respective R, G, and B portions. The non-transmitted light is absorbed in the filter, and substantially converted into heat. A general problem using this full color approach is the limited brightness of the display. Basically, due to absorption in the RGB filter, the full color display is only ⅓ as bright as the monochrome version. The remaining ⅔ of light is absorbed in the color filter. State of the art systems according to this principle, based on black and white particles with opposite polarities, are provided by E Ink Corporation.

An alternative to the above arrangements is to create an electrophoretic display wherein each pixel can take any color, thus eliminating the need for sub-pixels. This is achieved by controlling the number of particles of each color which move from a "reservoir" region (containing many particles of all three colors) into a visible pixel region. In this manner, a display that is 3-6 times brighter than an equivalent reflective LCD can be provided. An arrangement based on this principle is described in WO 03/019279.

However, to be able to separate the differently colored particles they must have different mobilities. This results in more complicated particle systems than those commercially available at present.

US 2002/0180688 provides a comprehensive description of various electrophoretic displays. In particular US 2002/0180688 considers two different types of display elements: the emissive (or transmissive) display element type and the reflective display element type. Emissive displays are said to operate according to additive rules and reflective displays are said to operate according to subtractive rules. In an additive system, the perceived color is displayed by superposition of the emission wavelengths from a plurality of emitting or transmitting particles. For example, a pixel comprised of three sub-pixels one for red light, one for green light, and one for blue light, respectively, is capable of generating all colors by superposing light, having different intensity, emitted from the sub-pixels. However, in a subtractive system the color perceived by a viewer consists of the portion of the spectrum that is not absorbed when light incidents on a reflector. A reflective system is thus considered a subtractive system since each reflective surface subtracts a certain fundamental color from the incident light. A yellow reflector absorbs blue light, a magenta reflector absorbs green light, and a cyan reflector absorbs red light. A display element of the subtractive type can be achieved, in accordance with one embodiment of the invention described in US 2002/0180688, utilizing the mentioned reflectors in combination with a white color state.

However, the current designs either have a limited brightness and/or color saturation, or are very complicated and expensive and are then often related with slow up-dating speeds. It is therefore desirable to create an electrophoretic display exhibiting improved brightness compared to the RGB approach but also reduced complexity and increased up-dating speeds compared to approaches using particles with different mobilities or many color states and several sets of particles.

To this end the present invention proposes a new electrophoretic display design based on a novel light filtering arrangement.

As is commonly known, the three fundamental colors (red, green, and blue) are required in order to provide a full-color display. That is, any color is achievable in case the intensities of the three fundamental colors are separately controllable. In the prior art RGB-filter approach, the colors are separately provided for by three sub-pixels. Each sub-pixel is provided with a color filter that absorbs all light except the light desired in that particular sub-pixel (e.g. the red filter portions absorb green and blue light, i.e. ⅔ of all light). The monochrome display, on the other hand, only serves as a light valve, reflecting more or less of the light transmitted through the RGB filter.

The optimal solution, of course, would be to have particles of three different colors that are easily and accurately controllable independent from each other. The approach using different mobilities is a variant on this principle, but resulting in vastly increased complexity and cost.

Thus, according to a general aspect of the invention, a color electrophoretic display is provided. The inventive display comprises at least one pixel, which is operative to emit visible light in a predetermined range of wavelengths, and which comprises at least two sub-pixels. Each sub-pixel, in turn, comprise: a color filter operative to absorb a fixed sub-range of said range of wavelengths, an electrophoretic media comprising two types of particles, each type of particle being operative to absorb a second and third sub-range of said range of wavelengths, respectively, and means for separately controlling the spatial distribution of the respective particles in said electrophoretic media between visible and invisible locations. The fixed sub-ranges of the respective sub-pixels in each pixel are essentially non-overlapping and in combination cover essentially all of the predetermined range of wavelengths. Furthermore, the second and third sub-ranges in each sub-pixel are different from each other, and cover essentially all of the predetermined range wavelengths only in combination with the fixed sub-range of the related sub-pixel. The color filter can be e.g. a color filter element or be comprised in the electrophoretic media as a colored fluid.

In effect, essentially any wavelength in the predetermined range of wavelengths can be displayed by more than one of the sub-pixels in each pixel. To this end it is important that neither of the second and the third sub-ranges cover the entire predetermined range of wavelengths on which the display is operative (e.g. that non of the particle types is black in a full-color display operating in the entire visible spectrum) since this would make the pixel inoperative to display more than one saturated color.

Basically, the predetermined range of wavelengths in which the display is to operate is thus divided into three spectral sub-ranges, where each sub-range corresponding to a color portion of the complete range of wavelengths. In prior art RGB displays with a low degree of complexity (i.e. only one or two particle types); each sub-pixel is typically devoted to display only one of the three colors and is thus switchable between a dark state and a specific color state. However, in the inventive display each sub-pixel is operative to display two spectral sub-ranges (i.e. every sub-range except the one that is absorbed by the respective color filter element). Thereby any given wavelength in the predetermined range of wavelengths can be displayed by two sub-pixels instead of only one sub-pixel, resulting in a twice as bright low complexity display.

The color filter can be provided either on a viewer side of the electrophoretic media or on the opposite side (i.e. the backside) of the electrophoretic media. In case the filter is arranged on the viewer side, it should transmit the sub-ranges of the wavelength range that it does not not absorb. In case the filter is provided on the backside, it might however reflect the sub-ranges of the wavelength range that it does not absorb. In such case, the color filter could operate both as a color filter and as a reflector. The particles should preferably transmit the sub-ranges of the wavelength range that they do not absorb in an essentially non-back scattering manner. Thereby light rays traveling through the electrophoretic media can be filtered by a number of ray intersecting particles which thereby superimpose their filtering properties. Another possibility is to make the particles reflective, such that they reflect the wavelength range that they do not absorb. However, in such case their filtering properties cannot be superimposed making image control more difficult. Thus, according to one embodiment, the color filters as well as the particles are operative to transmit the respective sub-ranges that they do not absorb. Of course, the particles and/or the filter might still have a marginal reflective side-effect. However, according to this embodiment, the color filter and particles transmit, in an essentially non-back scattering manner, the remainder of the sub-ranges of the wavelength range that is not absorbed such that the filtering properties can be effectively superimposed.

The electrophoretic display according to the present invention can be used as a full color display, operative in the full spectrum of visible light, or it can be operative only for a portion of the visible spectrum (e.g. displaying two colors and omitting one color out of red, green, and blue). In other words, the predetermined range of wavelengths that the display operates in can be a restricted region of the entire visible spectrum. However, full color displays are most widely used. Thus, according to one embodiment, the predetermined range of wavelengths in which the display is operative includes the entire spectrum of visible light.

In case the display is a full-color display, operating in the entire spectrum of visible light, the respective fixed sub-ranges of the sub-pixels (i.e. the sub-range that the respective color filter absorbs) are preferably red, green, and blue, respectively, such that the respective filter element are operative to transmit cyan, magenta, and yellow light waves. Such filters are often referred to simply as cyan, magenta, and yellow filters, respectively. A sub-pixel having a yellow filter is unable to emit blue light, since this is absorbed in the filter, but can potentially emit both red and green light (depending on the particular particle configuration in the electrophoretic media). A sub-pixel having a magenta filter is unable to emit green light, since this is absorbed in the filter, but can potentially emit both red and blue light. And, finally, a sub-pixel having a cyan filter is unable to emit red light, since this is absorbed in the filter, but can potentially emit both blue and green light.

According to one embodiment the particles are operative to absorb red, green, and blue light waves, respectively, and to transmit cyan, magenta, and yellow light waves. Thereby the absorption spectra of the particles in each sub-pixel are essentially non-overlapping. Such particles are often referred to simply as cyan, magenta, and yellow particles, respectively. In combination with cyan, magenta, and yellow filter elements, the triad of the color filter element and the two particle types in each sub-pixel together form a non-overlapping spectrum covering the entire spectrum of visible light. The particles can be used to selectively absorb parts of the light that is transmitted through the filter element. For example, a sub-pixel having a yellow filter element and only cyan particles in visible locations will appear green, as will a sub-pixel having a cyan filter element and only yellow particles in visible locations. However, the sub-pixel having a yellow filter element can alternatively appear red, in case only magenta particles are in visible locations, and the sub-pixel having a yellow filter element can alternatively appear red, in case only magenta particles are in visible locations.

According to an alternative embodiment, the particles are instead operative to absorb cyan, magenta, and yellow light waves, respectively, and to transmit red, blue, and green light waves. Such particles are often referred to simply as red, blue, and green particles, respectively. Such a red, blue, and green particle system actually has the same functional effect as the above-described particle system. For example, in a sub-pixel having a yellow filter element, red and green particles can be dispersed in the electrophoretic media. The sub-pixel can then display red light by only having green particles visible and can alternatively display green light by only having red particles visible. Comparing with the cyan, magenta, and yellow particle system, the main difference is that the red, blue, and green particles are operative to absorb not only one of the two colors that are not absorbed by the color filter element, but also to absorb the same color as the color filter element. This additional absorbing effect has no real relevance however, since the additional color is anyway absorbed by the color filter.

Exploiting such a simple particle system, only requiring two types of particles in each sub-pixel, provides for simple and straightforward control of the positions of the respective particles. Selective control of the respective particle types is most conveniently provided for by charging the particles with opposite polarities. Thus, according to one embodiment, the two particle types in each sub-pixel have different polarities.

According to one particular aspect of the present invention, a full-color electrophoretic display is provided wherein each pixel comprises: a yellow sub-pixel comprising a yellow light filter and an electrophoretic media comprising cyan particles and magenta particles having opposite polarities, a magenta sub-pixel comprising a magenta light filter and an electrophoretic media comprising cyan particles and yellow particles having opposite polarities, and a cyan sub-pixel comprising a cyan light filter and an electrophoretic media comprising yellow particles and magenta particles. The sub-pixels further comprises means for separately controlling the spatial distribution of the respective particles, such that, in each pixel, any fundamental color out of red, green, and blue can be displayed by two out of the three differently colored sub-pixels. Since only two particle types are used in each sub-pixel, the driving arrangements can be simplified compared to, for example, arrangements exploiting different particle mobilities. However, the combined use of color filters and particles each absorbing only one fundamental color results an increased brightness compared to prior art RGB displays.

According to this aspect, the respective filter portions of the sub-pixels transmit two fundamental colors (out of red, blue, and green) and absorb only one. Thereby ⅔ of the light is transmitted, an increase with 100% compared to the prior art RGB arrangements. The filter is then basically a CMY filter (cyan, magenta, and yellow), structured the same way as the prior art RGB filter but instead providing cyan, magenta and yellow filter portions. Furthermore, according to the invention, the electrophoretic media in each sub-pixel comprises particles of two different types, each type absorbing one of the two fundamental colors not absorbed by the corresponding color filter. Thus, in a sub-pixel having a cyan color filter (absorbing red light), the electrophoretic media comprises magenta colored particles (absorbing green light) and yellow colored particles (absorbing blue light). The respective color particles in each sub-pixel are charged with opposite polarities, and are thus easily controllable by means of electric fields. With this arrangement two out of the three sub-pixels can emit each fundamental color. For example, in case red color is desired, the magenta particles in the yellow sub-pixel and the yellow particles in the magenta sub-pixel are used. Thereby the blue light is absorbed by the yellow filtering properties and the green light is absorbed by the magenta filtering properties. In the cyan sub-pixel, both the magenta and the yellow particles are used resulting in a dark sub-pixel since all light is absorbed.

In other words, according to this particular aspect a bright, full-colored electrophoretic display is provided using a CMY color filter in combination with a reduced number of particle types, said particles having only a positive or a negative charge and no required difference in mobility. By providing CMY particles (i.e. with R, G, and B light absorption, respectively) and combining e.g. C and M particles with a Y color filter (and the remaining two permutations), it is possible to generate a display two times brighter than a display having a RGB color filter. According to one embodiment, the electrophoretic media in each sub-pixel is contained in a visible pixel volume, providing for said visible locations, and two reservoirs, each reservoir providing for invisible locations for particles of respective types. This setup provides for easy separation of the particle species in the respective reservoir, separated from the visible pixel volume that provides for the actual pixel area that is visible for a viewer.

According to one embodiment, the means for separately controlling the spatial distribution of the respective particles comprises data electrodes and reset electrodes arranged in each reservoir. The reset and data electrodes provides for accurate control of the positions of the respective particle species. The reservoirs are preferably arranged diametrically opposed to each other, separated by the visible pixel volume. Thereby the electrodes of one reservoir can easily form part of an electrical field configuration for moving particles of the opposite reservoir. Typically one reset electrode and one data electrode is enough for each reservoir. However, the actual number of electrodes and their particular shape depends on the display design at hand.

According to one embodiment, a black matrix covers the reservoirs such that particles residing in the respective reservoir are made invisible. Thereby the appearance of the pixel is independent from the exact particle positions within the reservoirs.

The inventive electrophoretic display can be of the reflective type, reflecting ambient light, or it can be of the transmissive type, comprising a light source.

Thus, according to one embodiment, each sub-pixel comprises a reflector, such that ambient light transmitted through said color filter element and said electrophoretic media is reflected back and retransmitted through said color filter element. Thereby any ambient light in the predetermined range of wavelengths that is transmitted through the color filter and through the electrophoretic media is effectively reflected back and visible for a viewer. Optionally, the brightness of this reflective display could be enhanced by using a front light assembly.

However, according to another embodiment, the inventive electrophoretic display further comprises a light source operative to emit light through said color filter elements via said electrophoretic media. The light source is thus mounted behind the electrophoretic media seen from a viewer side of the display. The light source might be of any conventional type, for example comprising a light generator, or lamp, emitting light via a light guide to the electrophoretic media. The choice between reflective and transmissive configurations is typically based on conventional considerations, such as the required brightness compared to the allowed power consumption. The invention thus requires two different particles to be placed in each of the different sub-pixels. The straightforward number of particles is thus six. However, according to one embodiment the particles are all chosen from a group consisting of: positively charged particles operative to absorb wavelengths of a first color, negatively charged particles operative to absorb wavelengths of a second color, positively as well as negatively charged particles operative to absorb wavelengths of a third color. Thereby the total number of particle species in the display can be reduced to four, rendering a more simple particle system and not requiring the provision of as many particle types.

When manufacturing the display, an accurate mixture of electrophoretic media and the right particle types and numbers is typically filled into each sub-pixel. The straightforward approach here is to use three different types of mixtures, each mixture being suited for one type of sub-pixels. However, it is possible to further simplify the manufacturing process using only two types of mixtures. For example, a first mixture comprising positive cyan and magenta particles and negative yellow particles, and a second mixture comprising positive cyan and negative magenta particles can be used in a CMY pixel. The first mixture is used for the cyan and magenta sub-pixels and the second mixture is used for the yellow sub-pixel. There is obviously no difference in the yellow sub-pixels, they still only contains two different particle types. The cyan and magenta sub-pixels, however, contains three particle types, two of which cannot be separated by electrical fields since they have the same polarity. Thus, in these sub-pixels the cyan and magenta particles will always come hand in hand. Increasing the number of visible cyan particles will inevitably increase the number of visible magenta particles, and vice versa. However, in the cyan sub-pixel the red light is already absorbed by the color filter, so the displayed image of those sub-pixels will be unaffected by the presence of cyan particles since there will be no red light to absorb. The same goes for the magenta particles in the magenta sub-pixels.

Thus, according to one embodiment, the electrophoretic media comprises a third particle type that is operative to absorb essentially the same spectral sub-range as the corresponding color filter element. The third particle type can be present in every sub-pixel or only in a subset of the sub-pixels in each pixel. Thereby the required number of different electrophoretic mixtures is reduced with one from three to two for a pixel having three sub-pixels.

According to another aspect of the invention, a method of manufacturing a color electrophoretic display as described above is provided. According to the inventive method, an ink-jet printing technology is used for filling the pixels with particles/electrophoretic media. For example, defined volumes of a particle suspension in fluid can be dosed using an ink-jet print head into individual sub-pixel areas, each of which is surrounded by a pixel wall structure, in a manner similar to that used for manufacturing polymer light emitting diode displays.

According to still one aspect, a method for driving an electrophoretic display as described above is provided. The inventive method comprises the steps of: resetting each sub-pixel by moving the particles to their respective reservoir, receiving pixel image information regarding an image to be displayed, determining a particle mixture corresponding to said image, and filling each pixel volume with color particles thus forming said particle mixture. By resetting the particles in their respective reservoir before addressing the display, accurate colors can be achieved with minimum color deviations occurring due to inaccurate particle positions.

According to one embodiment of the driving method, the step of resetting each sub-pixel comprises the sub-step of:

applying reset voltages to reset electrodes in each sub-pixel, and the step of filling each pixel volume comprises the sub-steps of:

applying a fill voltage to said reset electrodes, said fill voltage being lower than said reset voltages, controlling the number of particles entering each pixel volume by applying control voltages to data electrode in each sub-pixel;

removing any excess particles from the pixel volume by increasing the control voltages.

According to one embodiment, the step of filling each pixel volume is carried out simultaneously for both particle types in each sub-pixel.

According to another embodiment, the step of filling each pixel volume is carried out sequentially for both particle types in each sub-pixel.

In the following, the layout and operation of the inventive electrophoretic display will be explained with reference to the accompanying drawings, on which:

FIG. 1 is a diagram illustrating the entire spectrum of visible light, comprising the red, blue, and green regions, as well as the absorbing regions of cyan, magenta, yellow, red, green, and blue absorbing filters.

FIG. 2 schematically shows a cross-section of an inventive display, and illustrates the transmittance of green light.

Figure 1:
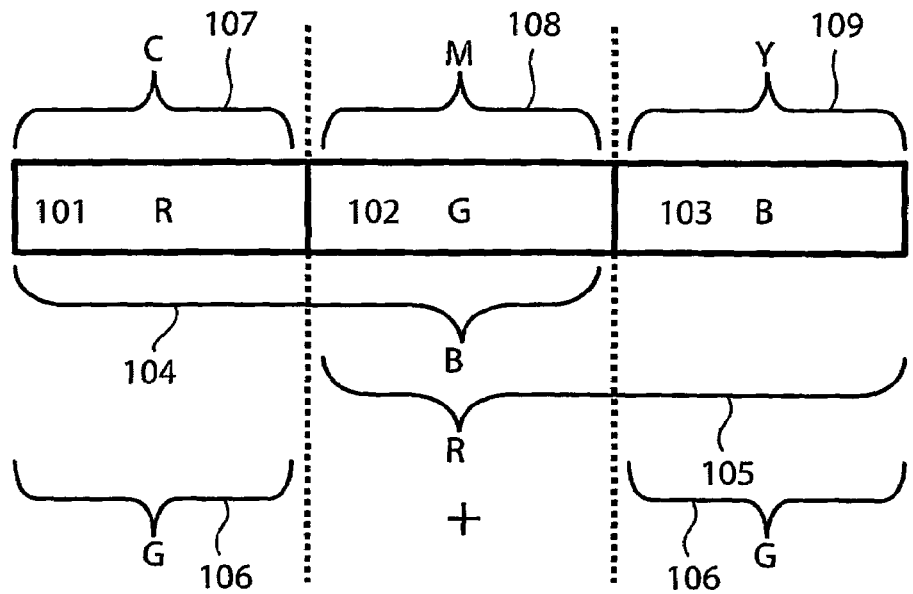

Thus, FIG. 1 illustrates the entire spectrum of visible light, consisting of a red 101 region, a green region 102, and a blue region 103. A cyan color filter 107 absorbs the red region, a magenta color filter 108 absorbs the green region, and a yellow color filter 109 absorbs the blue region. This type of color filters is typically referred to as subtractive, since one particular color is removed while the other colors are left unaffected. In comparison, a red 105 color filter absorbs both the green and the blue regions (leaving the red light unaffected), a green 106 color filter absorbs the red and the blue regions, and a blue 104 color filter absorbs the red and the green regions.

Figure 2:
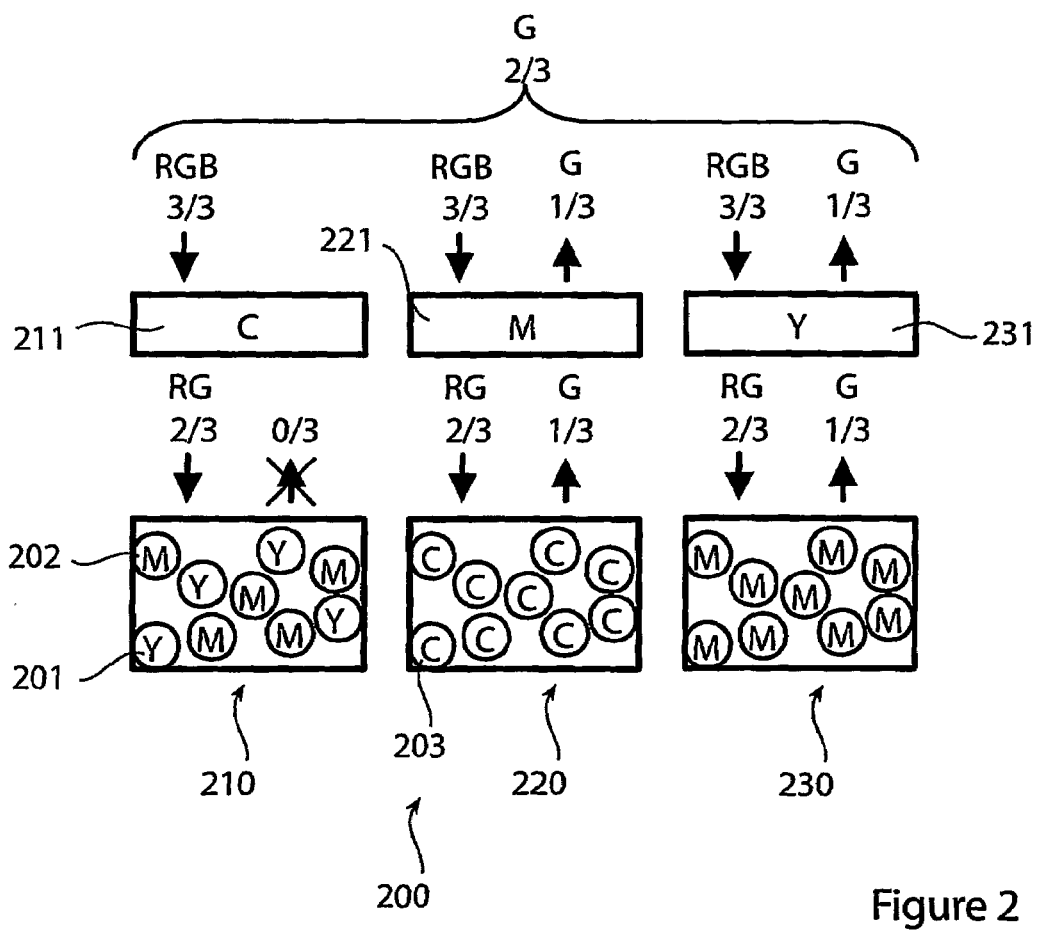

FIG. 2 schematically shows cross-sections of a pixel 200 which comprises a cyan 210, a magenta 220, and a yellow 230 sub-pixel. This particular pixel is tuned to display pure green light. Thus, green light is reflected and the remaining light is absorbed. The cyan sub-pixel 210 is inoperative to display green light (which is absorbed by the cyan filter 211), and this particular sub-pixel is therefore turned black by showing both particle types (magenta 202 and yellow 201). The magenta sub-pixel 220 (comprising a magenta color filter 221) reflects green light by showing yellow particles 203 only, and the yellow sub-pixel 230 (comprising a yellow color filter 231) reflects green light by showing magenta particles 202 only. Thus, ⅔ of the impinging green light is reflected (⅓ by the magenta and ⅓ by the yellow it sub-pixel). However, theses values are theoretical and must be reduced by the aperture ratio and other possibly limiting factors.

From the above, displaying pure red or pure blue light is straightforward. Furthermore, accurate balancing of the particle densities of each sub-pixel facilitates any color mixture to be displayed with a brightness of up to ⅔ of the impinging light of each corresponding color.

Figure 3:
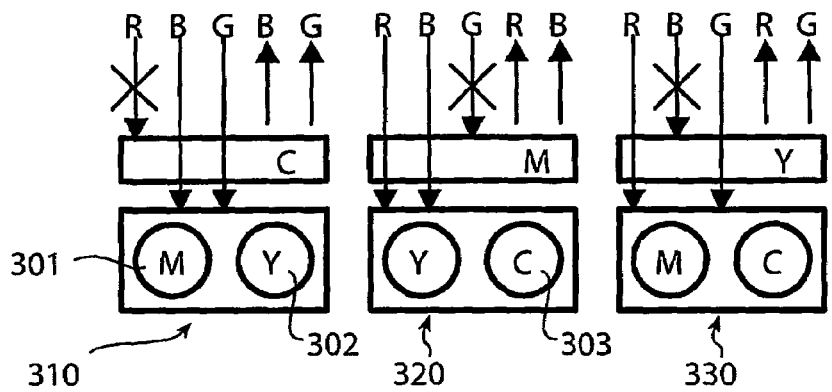
FIGS. 3 and 4 illustrate cross-sections of embodiments of the present invention, having CMY and RGB particles, respectively, and also illustrates possible colors to be transmitted by each sub-pixel.

FIG. 3 schematically shows a possible particle system for the inventive display. In this particular embodiment the cyan sub-pixel 310 comprises magenta 301 and yellow 302 particles, the magenta sub-pixel 320 comprises yellow 302 and cyan 303 particles, and the yellow sub-pixel 330 comprises magenta 301 and cyan 303 particles. The particles in each sub-pixel are thus operative to selectively absorb only one of the fundamental colors not absorbed by the respective color filter. In each sub-pixel, one of the particle species has a positive charge, and the other a negative charge.

Figure 4:
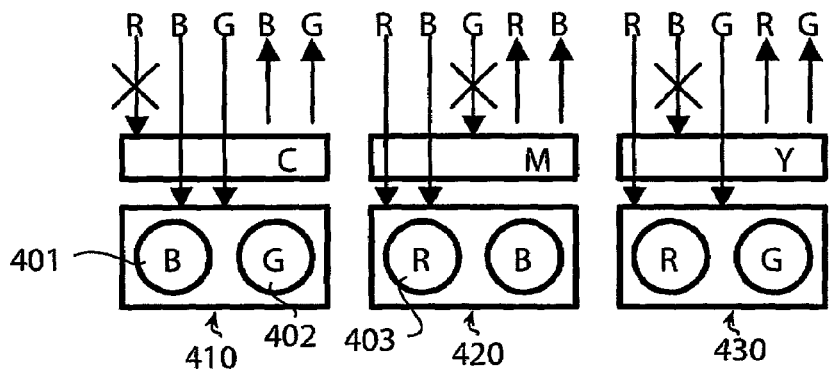

However, FIG. 4 illustrates an alternative particle system, wherein the cyan sub-pixel 410 comprises blue 401 and green 402 particles, the magenta sub-pixel 420 comprises red 403 and blue 401 particles, and the yellow sub-pixel 430 comprises red 403 and green 402 particles. This embodiment actually operates in the same way as the system described with reference to FIG. 3. The only difference is that in each sub-pixel, the respective particles not only absorb the two remaining colors but also absorb any light of the color that should have been absorbed by the color filter. Thus, the color filter and the particles in each sub-pixel have overlapping absorption bands. Provided that the color filter actually absorbs all light of its corresponding color, the overlap does not affect the perceived image. In alternative embodiment the overlap is only partial. The important issue here is that the particles need not have completely separate absorption bands. However, they should have essentially separated absorptions bands for the colors that are not absorbed by the respective color filter to provide for complete and controllable color reproduction.

In order to provide for completely black images, the particles and the color filter in each sub-pixel must be able to absorb the complete range of visible colors. The actual absorption band boundaries, i.e. the definition of each of the three fundamental colors, might however vary depending on the application. It is however important that non of the two particle types in each sub-pixel forming the above particle system absorbs the complete residual color band from the corresponding color filter, since this would make the pixel inoperative to display more than one primary color and render bright full-color reproduction impossible.

The above-described pixels all comprise three sub-pixels and provide for full-color images. However, it is also possible to provide images using pixels with only two sub-pixels. For example, looking at FIG. 3 but omitting for example the yellow sub-pixel 330 gives a pixel still operative to display any color. However, the capability of displaying red and green light is reduced, since only one sub-pixel can be used (giving a brightness of ½). On the other hand, the capability of displaying blue light increases to ¹⁄₁, since every sub-pixel is then capable of displaying blue light. And, of course, the black state is still available for every sub-pixel. Depending on the application at hand, this might be advantageous. For example, the absorption bands of the color filters and the particles can be chosen so that the wavelength bands (sub-regions) that can be displayed by only one of the sub-pixels are wider than the band wavelength band that can be displayed by both sub-pixels. Thereby the maximum brightness of each wavelength band can be made equal. An advantage using this approach instead of simply using sub-pixels without color filters and with particles of different colors is the provision of the black state.

Alternatively, it is possible to add more than three sub-pixels to each pixel whereby co-called multi-primary color displays are facilitated. Also here many different varieties are conceivable for a person skilled in the art given this description.

Figure 5:
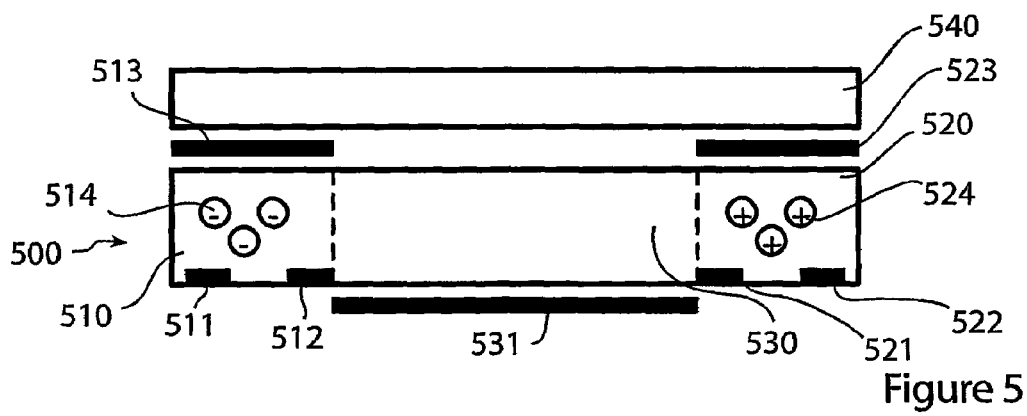
FIGS. 5 and 6 illustrate cross-sections of an inventive display having a visible region and two reservoirs.

Focusing on a single sub-pixel 500 in a particular embodiment, as shown in FIG. 5, it can be noted that the sub-pixel comprises two reservoirs 510, 520, one for each particle species 514, 524, separated by a visible pixel volume 530. The sub-pixel furthermore comprises a color filter 540. In the figure, the respective regions of the sub-pixel is separated by dotted lines that are included for illustrative purposes only. The reservoirs 510, 520 comprise data electrodes 512, 521, a reset electrode 511 for negatively charged particles 514, and a reset electrode 522 for positively charged particles 524. The data electrodes 512, 521 may be connected via thin film transistors (TFTs) to data drivers in an active matrix, thus shielded from visual display, while the reset electrodes may be common electrodes for a plurality of pixels or even for the entire display. A black matrix 513, 523 covers the reservoirs. The pixel further comprises a white reflective background 531. Furthermore, barriers forming sub-pixel walls may separate the sub-pixels from each other. Optionally, the brightness of this reflective display could be enhanced by using a front light assembly.

Figure 6:
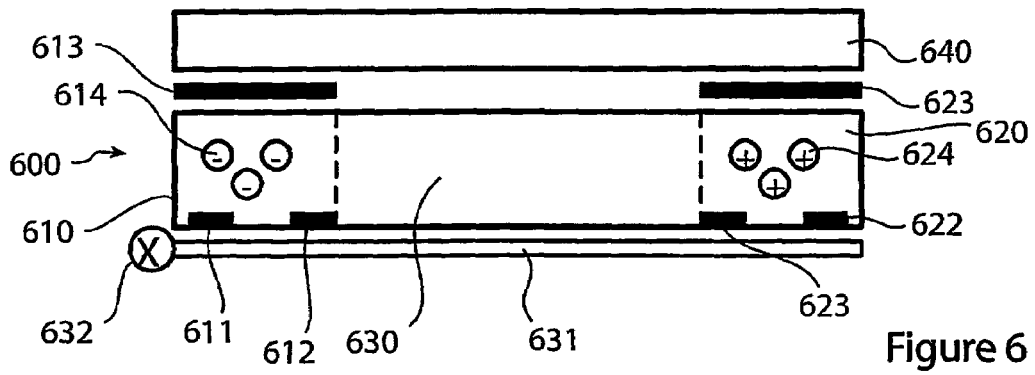

In an alternative embodiment, the inventive display is transmissive. This is illustrated in FIG. 6, where each sub-pixel comprises two reservoirs 610, 620, a visible region 630, and a color filter 640. Each reservoir 610, 620 comprises respective data and reset electrodes 612, 623, 611, 622, operative to control the positions of negative and positive particles 614, 624, and is covered by a black matrix 613, 623. However, instead of white reflectors, the display is fitted with a backlight, comprising for example a light guide 631 and a light source 632.

The choice between a transmissive and a reflective display for a particular application is typically made on conventional basis, depending on for example the desired brightness and the allowed power consumption.

The sub-pixels are filled with the corresponding electrophoretic solutions, comprising the correctly colored and charged particles, for example using the Ink jet printing technology. In Ink-jet printing, defined volumes of the particle suspension in fluid can be dosed using an ink-jet print head into individual sub-pixel areas, each of which is surrounded by a pixel wall structure. Similar techniques are used for manufacturing polymer light emitting diode displays.

The perceived color of the pixel is determined by the number of visible particles of each color type that are present in each sub-pixel volume. If no particles are present, the sub-pixel takes the color of its color filter (⅔ brightness in case of full-color displays, reduced by aperture ratio). If all particles are present, the sub-pixel becomes black. Other colors are achieved by providing intermediate numbers of the respective particles.

Figure 7:
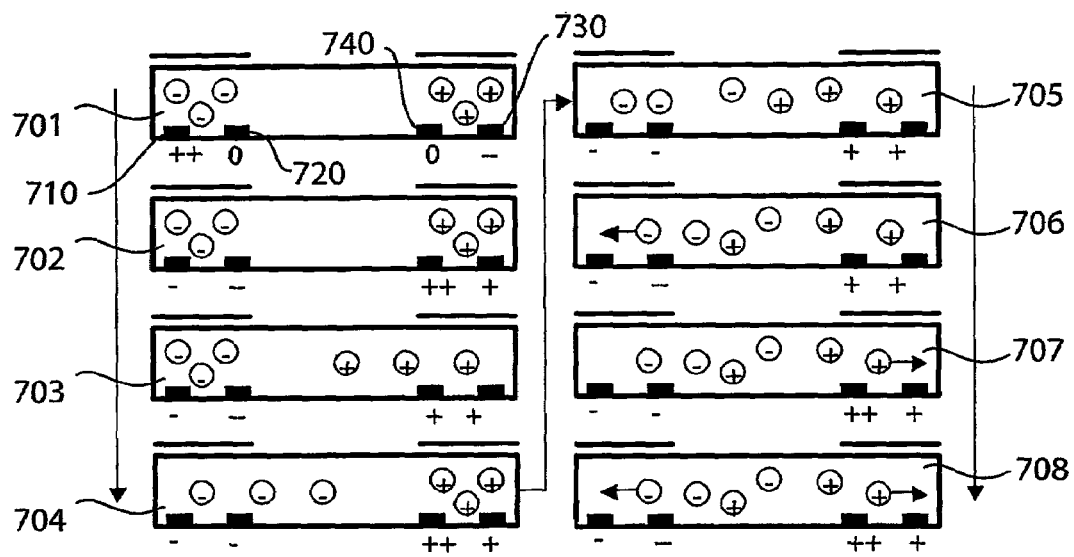
FIGS. 7 and 8 illustrate two alternative driving schemes for the inventive display.

According to one embodiment, illustrated in FIG. 7, of the present invention, a simultaneous driving approach is provided which describes the operation of a pixel. The approach proceeds as follows:

Reset (step 701): all positively and negatively charged particles are returned to their respective reservoirs by supplying negative and positive voltages to reset electrodes 730 and 710, respectively. As these electrodes may be common to the entire display, it is possible to apply an extremely high voltage to these electrodes, since they (unlike the data electrodes) do not need to be connected to TFTs.

Filling: a lower negative and positive voltage is supplied to the reset electrodes 710, 730, respectively.

If neither type of particles is to be moved into the pixel volume, a higher positive voltage is supplied to one data electrode 720, and a lower or negative voltage is supplied to the other data electrode 740 (step 702).

If only one type of particles are to be moved into the pixel volume, a higher voltage is supplied to one of the data electrodes, and a low or zero voltage is supplied to the other data electrode (step 703 or 704, respectively).

If both types of particles are to be moved into the pixel volume, the lower negative and positive voltage is simultaneously supplied to data electrodes 720 and 740, respectively (step 705).

When sufficient numbers of particles have entered the pixel volume, excess particles are returned to the reservoir by supplying a higher negative voltage to one data electrode 720, or a higher positive voltage to the other data electrode 740. In the case where both particles are being filled, supplying for example a higher negative voltage to one data electrode 720 will prevent the further filling of negatively charged particles (step 706), but will increase the speed of filling of the positively charged particles. In this case, the driving signals must be modified to shorten the time where before a higher positive voltage was supplied to the other data electrode 740 (to stop the filling of the pixel). Similar considerations hold for the positively charged particles (step 707). In step 708, neither type of particles is being filled.

After the filling procedure is completed, the data electrodes 720, 740 and reset electrodes 710, 730 can be set to 0V, and if required the system can be powered down to avoid power dissipation.

Figure 8:
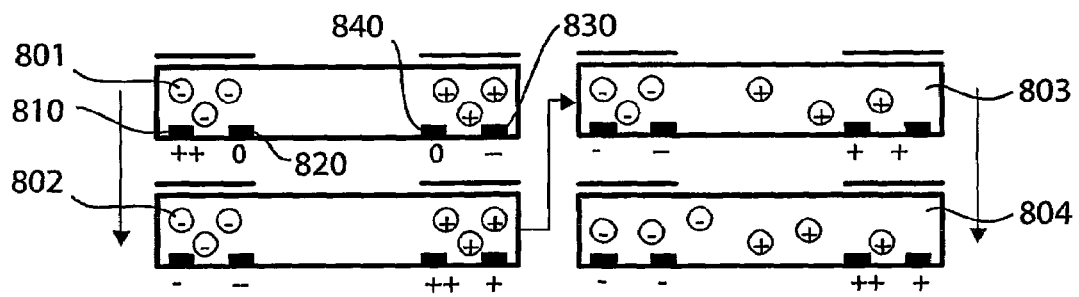

According to yet another embodiment of the invention, illustrated in FIG. 8, an alternative driving scheme utilizing a sequential driving approach is provided, providing for sequential filling of the pixel volume with the different type of particles. The first two steps 801 and 802 are equal to the simultaneous driving illustrated with reference to FIG. 7 (i.e. step 701 and 702). In this case however, when firstly positive particles are being filled (step 803), supplying a higher negative voltage to one data electrode 820 will prevent the filling of negatively charged particles, whilst allowing the filling of positively charged particles. Subsequently, when negative particles are being filled (step 804), supplying a higher positive voltage to the other data electrode 840 will prevent the filling of negatively charged particles, whilst allowing the filling of positively charged particles. In this embodiment, the filling of positive and negative particles will proceed more quickly than in the previous embodiment (as the filling electric fields can be higher).

In general, 6 different types of charged particles may be used to realize the inventive pixel design for pixels having three sub-pixels. However, the number of particles can be reduced to only 4 types. This is the minimum number of particle species required for pixels having three sub-pixels. In this case, particles of a first color needs only to come with a positive polarity (e.g. cyan), particles of a second color needs only to come with a negative polarity (e.g. magenta), whilst particles of the third color need to come with both polarities (e.g. yellow). In this case the filling of the three sub-pixels of each pixel can proceed as follows:

Sub-pixel 1: cyan(+)/magenta(−)
Sub-pixel 2: yellow(+)/magenta(−)
Sub-pixel 3: cyan(+)/yellow(−)

In another embodiment, it is possible to further reduce the number of filling steps during manufacturing, from the three described above to only two. This can be done by using premixed suspensions of three particles, e.g. cyan(+)/magenta(−)/yellow(+) (mixture 1) and cyan(+)/magenta(−)/yellow(−) (mixture 2), for sub-pixel filling. Two out of three sub-pixels can be filled with the first mixture, the third one with the second mixture, e.g. mixture 1 in yellow sub-pixel, mixture 1 in cyan sub-pixel and mixture 2 in magenta suppixel. This is possible since in each sub-pixel the color of one of the particles (C, Y or M) corresponds to the color filter, rendering those particles essentially invisible to the viewer. With such an approach, the number of process steps can be reduced. However, since the second mixture is only used in type one sub-pixel, it only needs to contain two particle species. Thus, in an alternative embodiment, only one mixture contains three different particle species (e.g. mixture 1: cyan (+)/magenta(−)/yellow(+)) while the other mixture contains only two particle species (e.g. mixture 2: cyan(+)/yellow(−)).

It should be noted that the above described embodiments of the present invention are not to be construed as limiting the invention, but are rather given as examples of how the present invention may be utilized. A man skilled in the art will be able to design many alternative embodiments of this invention, without departing from the spirit and scope of this invention, as defined by the appended claims.

In particular, whilst the embodiments have been described in relation to color systems with 2 and 3 sub-pixels, it will be apparent that the inventions are equally applicable to systems comprising more than 3 sub-pixels and operating using the so-called multi-primary colour approach.

In addition, whilst embodiments have been described whereby the colour filter is arranged on the opposite side of the display to the reflective element, it is also possible to arrange for the colour filter to be positioned adjacent to the reflector, or to otherwise adjust the reflection spectrum of the reflector to create a suitable subtractive coloured reflector.

In essence, the present invention provides a novel design for color electrophoretic displays. In the display, each pixel comprises at least two sub-pixels, and each sub pixel is fitted with a color filter and contains an electrophoretic media comprising two particle types. The color filters in the sub-pixels of each pixel have essentially non-overlapping absorption bands, and together cover essentially all of the wavelengths over which the display is operative. Furthermore, the absorption bands of the particles in each sub-pixel each cover a portion of the wavelengths that is not covered by the filter in the respective sub-pixel. The wavelength bands typically correspond to different colors. Thereby each wavelength band, or color, can be emitted by more than one sub-pixel in each pixel, resulting in increased brightness. According to one particular embodiment, each pixel comprises three sub-pixels having a cyan, magenta, and yellow absorbing filter, respectively.

The invention claimed is:

1. A color electrophoretic display comprising at least one pixel operative to display visible light in a predetermined range of three or more wavelengths, each pixel comprising at least two sub-pixels which each comprise:
  a color filter operative to absorb one sub-range of said predetermined range of wavelengths and pass the other wavelengths;
  an electrophoretic media comprising two types of particles, each type of particle being operative to absorb a second and third sub-range of said predetermined range of wavelengths, respectively; and
  means for separately controlling the spatial distribution of the respective particles in said electrophoretic media between visible and invisible locations;
  wherein said fixed sub-ranges of the respective sub-pixels in each pixel are essentially non-overlapping and in combination cover essentially all of said predetermined range of wavelengths; and
  wherein, in each sub-pixel, said second and third sub-ranges are different from each other, and cover essentially all of said predetermined range of wavelengths only in combination with the fixed sub-range of the related sub-pixel.

2. A color electrophoretic display according to claim 1, wherein the color filter is a color filter element.

3. A color electrophoretic display according to claim 1, wherein the electrophoretic media comprises the color filter as a colored fluid.

4. A color electrophoretic display according to claim 1, wherein said color filters and said particles are operative to transmit wavelengths that are not absorbed.

5. A color electrophoretic display according to claim 1, wherein said predetermined range of wavelengths substantially covers the entire spectrum of visible light.

6. A color electrophoretic display according to claim 1, wherein each pixel comprises three sub-pixels in which the fixed sub-ranges of the filter elements cover red, green, and blue wavelengths, respectively, such that the respective filter elements are operative to transmit cyan, magenta, and yellow light waves, respectively.

7. A color electrophoretic display according to claim 1, wherein said particles are operative to absorb red, green or blue, wavelengths, respectively, and thus to transmit cyan, magenta, or yellow wavelengths.

8. A color electrophoretic display according to claim 1, wherein said particles are operative to absorb cyan, magenta, or yellow wavelengths, respectively, and thus to transmit red, green or blue, wavelengths.

9. A color electrophoretic display according to claim 1, wherein said two particle types in each sub-pixel have different polarities.

10. A color electrophoretic display according to claim 2, wherein said electrophoretic media in each sub-pixel is contained in a visible pixel volume, providing for said visible locations, and in two reservoirs, each reservoir providing for invisible locations for particles of respective type.

11. A color electrophoretic display according to claim 10, wherein said means for separately controlling the spatial distribution of the respective particles comprises data electrodes and reset electrodes arranged in each reservoir.

12. A color electrophoretic display according to claim 10, wherein said reservoirs are covered by a black matrix such that particles residing in the respective reservoir are made invisible.

13. A color electrophoretic display according to claim 1, wherein each sub-pixel comprises a reflector reflective for light in said predetermined range of wavelengths, such that ambient light transmitted through said color filter element and through said electrophoretic media is reflected back and retransmitted through said color filter element.

14. A color electrophoretic display according to claim 1, further comprising a light source operative to emit light in said predetermined range of wavelengths through said color filter elements and through said electrophoretic media.

15. A color electrophoretic display according to claim 1 or 2, wherein said particles are all chosen from a group consisting of:
  positively charged particles operative to absorb wavelengths of a first color,
  negatively charged particles operative to absorb wavelengths of a second color, positively charged particles operative to absorb wavelengths of a third color, and negatively charged particles operative to absorb wavelengths of said third color, such that the total number of particle types in the display is four.

16. A color electrophoretic display according to claim 1, wherein said electrophoretic media in at least one sub-pixel comprises a third particle type which is operative to absorb essentially the same sub-range of wavelengths as the corresponding color filter element in that sub-pixel.

17. A method of manufacturing a color electrophoretic display according to claim 1, using an ink-jet printing technology for filling said pixels with said electrophoretic media.

18. A method for driving a color electrophoretic display according to claim 10, comprising the steps of:

resetting each sub-pixel by moving the particles to their respective reservoir;

receiving pixel image information regarding an image to be displayed; determining a particle mixture corresponding to said image; and filling each pixel volume with color particles thus forming said particle mixture.

19. A method according to claim 18, wherein the step of resetting each sub-pixel comprises the sub-step of:

applying reset voltages to reset electrodes in each sub-pixel, and wherein the step of filling each pixel volume comprises the sub-steps of:

applying a fill voltage to said reset electrodes, said fill voltage being lower than said reset voltages, controlling the number of particles entering each pixel volume by applying control voltages to data electrode in each sub-pixel;

removing any excess particles from the pixel volume by increasing the control voltages.

20. A method according to claim 18, wherein the step of filling each pixel volume is carried out simultaneously for both particle types in each sub-pixel.

21. A method according to claim 18, wherein the step of filling each pixel volume is carried out sequentially for each particle type in each sub-pixel.

* * * * *